May 14, 1968   I. B. WHITE   3,382,899
SHEARING MACHINE
Filed July 10, 1967   2 Sheets-Sheet 1
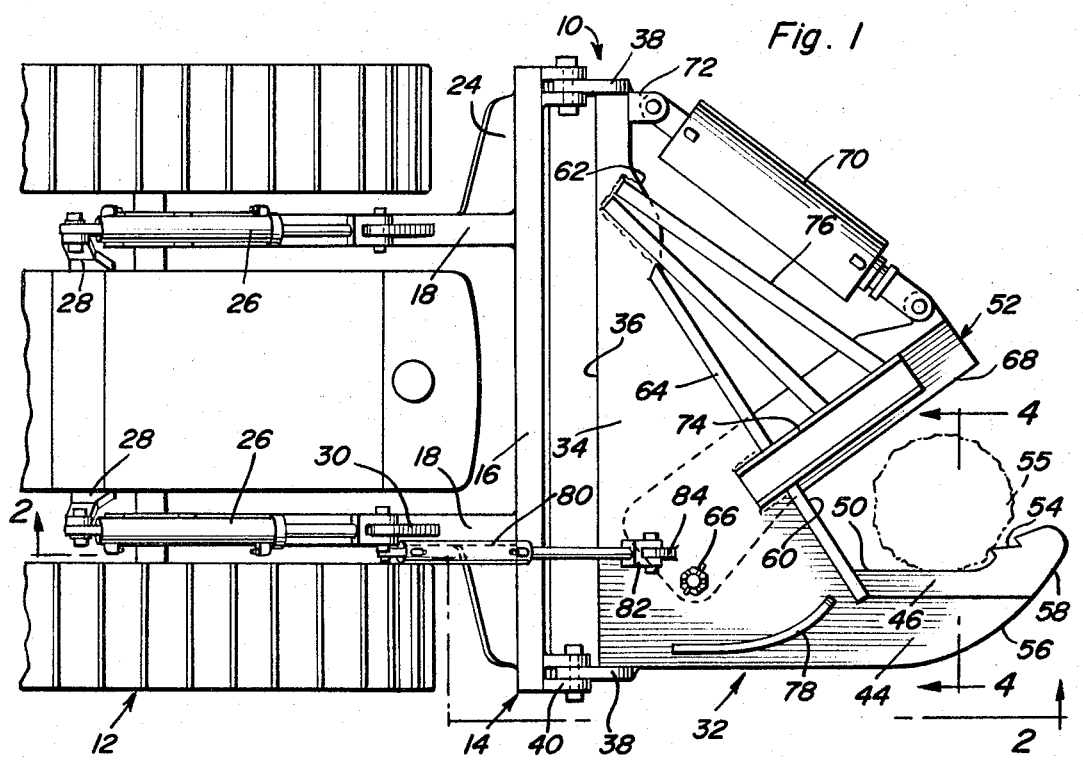
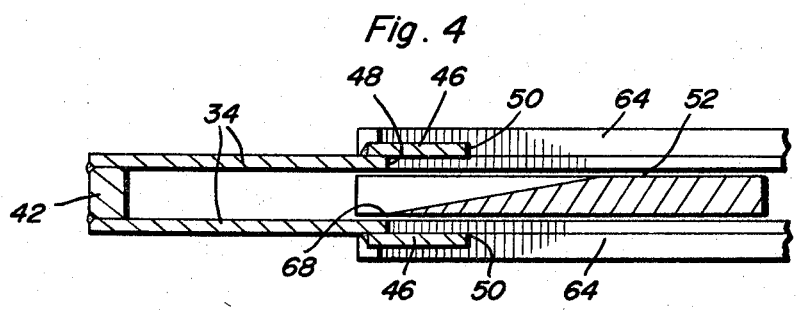
Idas B. White
INVENTOR.

May 14, 1968
I. B. WHITE
3,382,899
SHEARING MACHINE
Filed July 10, 1967
2 Sheets-Sheet 2
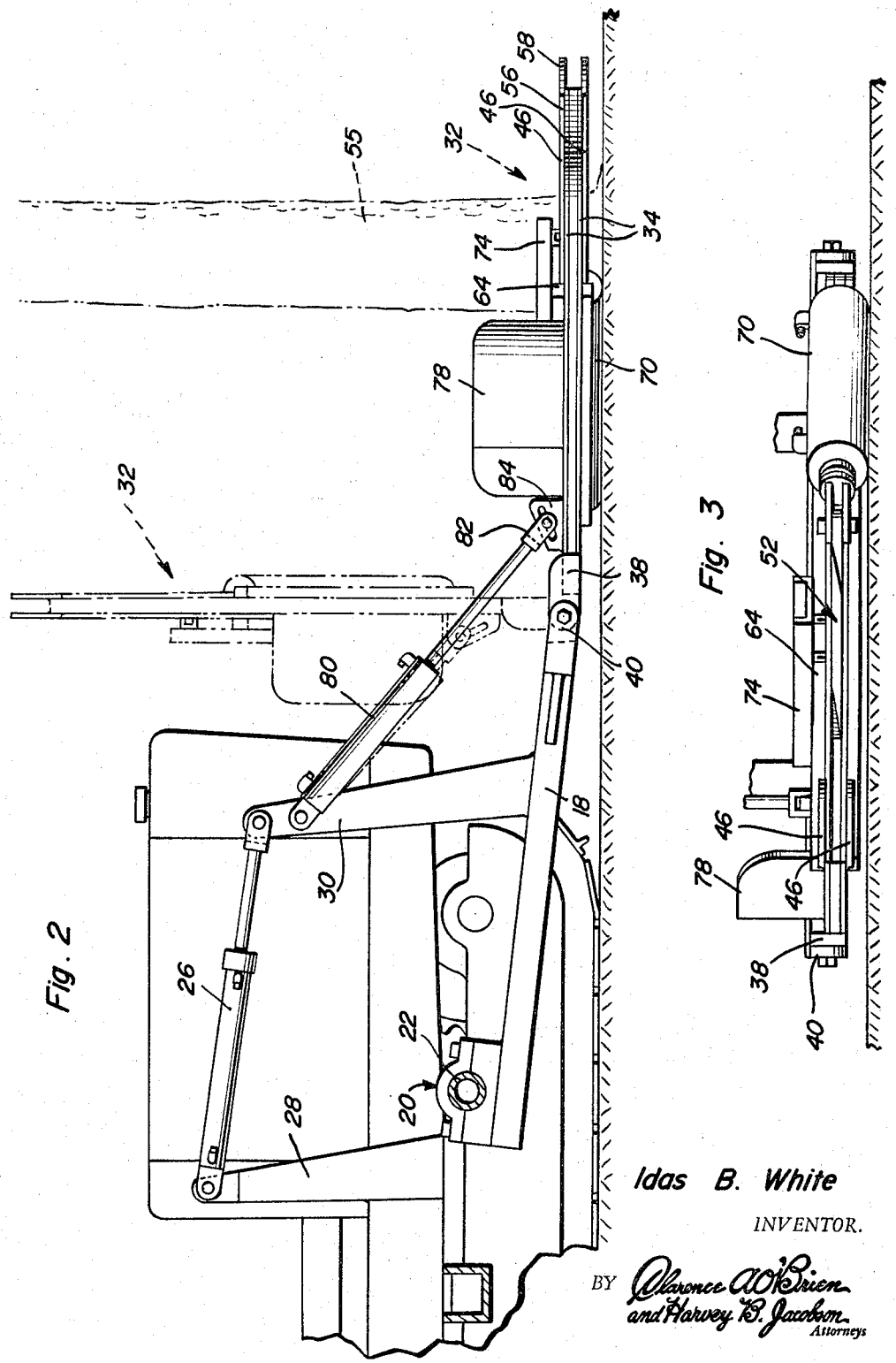
Idas B. White
INVENTOR.
BY Clarence A.O'Brien
and Harvey B. Jacobson
Attorneys 3,382,899
SHEARING MACHINE
Idas B. White, White Variety Shop,
Blountstown, Fla. 32424
Filed July 10, 1967, Ser. No. 652,295
10 Claims. (Cl. 144—34)

ABSTRACT OF THE DISCLOSURE

A device for felling trees utilizing a hydraulically driven cutter blade movable toward a jaw member so as to shear a tree located therebetween. This device is mounted on a tractor or similar vehicle and hydraulically controlled for vertical adjustment in a cutting orientation, as well as for an upward pivoting thereof to a vertical position immediately adjacent the tractor for unobstructed maneuverability of the tractor.

---

The instant invention is generally concerned with a tree felling or shearing machine, and is more particularly concerned with such a machine and its manner of mounting on a suitable transporting vehicle, normally a tractor or wheel skidder.

It is a primary object of the instant invention to provide a tractor mounted tree shear which can automatically be moved from a forwardly extending substantially horizontal cutting position to a vertical transporting position immediately adjacent the front end of the tractor.

In conjunction with the above object, it is a significant object of the instant invention to provide a tree shearing attachment which, because of its ability to be compactly folded against the tractor, does not tie up the tractor or similar vehicle for the single operation of cutting trees in that the maneuverability of the tractor with the folded shearing attachment is substantially the same as that of the tractor without the attachment mounted thereon. It will be appreciated that this also contributes significantly to the ability of the tractor to move through heavy underbrush and the like about the work site.

Another significant object of the instant invention resides in the provision of means whereby a positive downward thrust can be introduced into the attachment so as to effect a shearing or cutting of the tree being removed substantially closer to the ground than would normally otherwise be possible through a mere resting of the shearing device about the tree.

A further significant object of the instant invention resides in the provision of a cutting blade and jaw relationship which provides for a positive generally straight line shearing of the tree.

Basically, the tree shearing attachment of the instant invention comprises a C-frame pivotally mounted on a tractor for vertical pivoting movement in response to the selective extension and retraction of a fluid cylinder and piston unit engaged between the frame and the tractor. The frame in turn pivotally mounts, across the bight portion thereof, the actual shearing unit which comprises a longitudinally extending jaw and a pivotally mounted blade selectively swingable into said jaw for the shearing of a tree received therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the tree shearing attachment or machine of the instant invention mounted in operative position on a tractor;
FIGURE 2 is a side elevational view taken substantially on a plane passing along line 2—2 in FIGURE 1;
FIGURE 3 is a front view of the attachment; and
FIGURE 4 is a view taken generally on the plane of line 4—4 in FIGURE 1 with the blade in its innermost jaw nesting position.

Referring now more specifically to the drawings, reference numeral 10 is used to generally designate the tree shearing machine or attachment which is mountable on the forward end of and utilized in conjunction with a tractor 12 or similar vehicle as will be best appreciated from FIGURES 1 and 2.

The attachment 10 is mounted on the tractor 12 through a generally C-shaped frame 14 which includes an elongated mounting beam 16 extending across the full width of the front of the tractor 12, and a pair of elongated rearwardly extending lift arms 18 rigidly affixed to the beam 16. The arms 18, at the rear ends thereof, are pivotally affixed, as at 20, to an appropriate shaft 22 on the vehicle or tractor 12. As will be appreciated from FIGURE 1, the lift arms 18 are affixed to the beam 16 inwardly of the ends thereof so as to extend between the tractor body and the opposed tracks. In addition, rigidifying plates 24 can be provided as needed between each lift arm 18 and the beam 16.

It is contemplated that the mounting frame 14 be vertically pivotable about the tractor shaft 22, this being effective by a pair of double-acting fluid or hydraulic cylinder and piston units 26. Each of these units 26 is engaged between a fixed portion of the vehicle 12, for example an upright standard 28 positioned toward the rear of the motor housing, and a rigid vertical standard or post 30 affixed to the corresponding lift arm 18 toward the forward end thereof and generally adjacent the forward end of the motor housing of the tractor 12.

The shearing unit 32, positioned forward of the beam 16, is in turn pivotally mounted on the mounting beam 16 for vertical adjustment both therewith and about a horizontal axis relative thereto. This shearing unit includes a pair of laterally spaced similar flat rigid plates 34. These plates 34 are parallel and coextensive with the rear edges 36 thereof paralleling the mounting beam 16 in forwardly spaced relation thereto. A pair of mounting ears 38 are affixed to the opposed sides of the plates 34 and are pivotally or hingedly pinned between forwardly projecting pairs of similar ears 40 on the mounting beam 16 adjacent the opposite ends thereof. In this manner, the two plates 34, which constitute the base structure of the shearing unit 32, can be pivotally adjusted in a vertical plane relative to the mounting bar 16.

The two plates 34 are intimately formed into a single sandwiched type unit by spacer bars 42 extending along the overlying rear edge portions 36 as well as at least one pair of coextensive side edges.

The overlying plates 34 adjacent one edge thereof, project longitudinally forward so as to define a pair of jaw mounting portions 44 to which the jaws 46 are rigidly affixed, as by welding. Each of the jaws 46 consists of a flat plate-like member overlying the straight inner edge 48 of the corresponding plate or mounting portion 44 and projects laterally inward thereof so as to define a straight inner edge 50 which, in combination with the similar edge 50 of the second jaw 46, provides a resistance or abutment toward which the movable cutting blade 52 works during the severing operation. As will be best appreciated from FIGURE 1, these inner edges 50, toward the outer end thereof, curve sharply inwardly and have a plurality of rearwardly directed gripping teeth 54 defined therein so as to effect a positive grip on the particular tree 55 being severed and likewise avoiding any tendency of the tractor 12 backing away from the tree during the severing operation. The outer edges 56 of the two jaw mounting plate portions 44, as well as the forward or outer edges 58 of the two jaws 46 themselves, curve smoothly rearwardly so as to define a brush deflecting surface which facilitates the positioning of the jaw construction about the base of a tree. The forward edge 60 of each of the plates 34, inwardly of the inner edge 50 of the corresponding jaw 46, is inclined rearwardly and inwardly, terminating at a point beyond the longitudinal center line of the corresponding plate 34 in an edge portion 62 which generally parallels the corresponding rear edge 36. The inclined portion of each of the forward edges 60 of the plates 34 is rigidified and reinforced by a bar member 64 rigidly welded therealong.

The cutting blade 52 is pivotally mounted, through suitable pivot means 66, for parallel swinging movement between the plates 34 between a retracted position wherein the blade edge 68 projects forwardly at an acute angle to the jaw edges 50 and at approximately a right angle to the reinforced inclined portions of the plate forward edges 60, and a second position wherein the blade edge 68 is nested or received between the jaws 46 as illustrated in FIGURE 4. It will be noted that the actual blade edge 68 is laterally offset from the point of pivotal engagement of the blade, thereby providing for a movement of the cutting blade generally along a straighter path during the severing operation which, in conjunction with the rearwardly directed tree gripping teeth 54, acts so as to avoid any tendency to push the tractor away from the tree during the severing operation. It will be noted that this blade pivot point is in generally longitudinal alignment with the jaw edges 50.

The pivotal cutting movement of the cutting blade 52 is effected through a double-acting hydraulic cylinder and piston unit 70 pivotally engaged at the forward end thereof to the rear edge of the blade 52 at the leading end thereof, and at the rear end thereof to a pair of forwardly projecting mounting ears 72 rigid with the far side of the two plates 34 adjacent the rearwardly projecting mounting ear 38 which pivotally affixes the plates 34 to the frame mounting bar 16. In this manner, upon an extension of the piston of the unit 70, the blade 52 will pivot forwardly and act so as to sever a tree received between the blade 52 and the jaw construction. Upon a completion of the severing operation, a withdrawal of the piston will be effected so as to prepare the blade for a subsequent severing operation. Incidentally, the cylinder and piston unit 70, as will be the case with all the hydraulic units of the attachment, will normally be supplied from a tractor mounted reservoir, and similarly controlled from the cab of the tractor in a manner similar to the manner in which fluid is supplied to more conventional attachments incorporating fluid cylinders.

In order to assist in properly positioning the device about a tree, as well as stabilize and direct the tree during the felling operation, an elongated bracing beam 74 is rigidly affixed, as by welding, to the top plate 34 and projects forwardly therefrom and perpendicular to the inclined portion of the forward edge 60 so as to generally overlie and parallel the blade 52 in its retracted position. The forward end of this stabilizing beam 74 is braced and additionally supported by a pair of elongated rigid braces 76 extending from the rear edge of the beam 74 rearwardly into overlying welded engagement with the top plate 34 toward the far side thereof.

With reference to FIGURES 1, 2 and 3, it will also be noted that an upstanding underbrush deflecting shield 78 is affixed to the top plate 34 generally adjacent the near side, that side from which the jaw mounting portion 44 projects. This guard or deflector 78 curves forwardly and inwardly so as to allow any brush, coming in contact therewith to be outwardly directed away from the cutting operation.

A highly significant feature of the present invention is the fact that the shearing unit 32 can be pivoted to a vertical position immediately forward of the tractor 12. This is made possible by the pivotal connection of the shearing unit to the mounting bar 16, and is effected through an elongated hydraulic double-acting cylinder and piston unit 80 hingedly affixed at a first end to one of the lift arm standards 30 adjacent the upper end thereof, and at the second end thereof, through a yoke 82, to an ear 84 affixed to the top surface of the top plate 34 forward of the axis of rotation of the shearing unit 32. In addition to a pivotal engagement of the yoke 82 with the plate ear 84, it will also be noted that the ear 84 incorporates an elongated slot so as to allow for a slight sliding movement therebetween for insuring a proper swinging movement of the shearing unit between a generally horizontal operative position and a vertical transporting position. The cylinder and piston unit 80 will also of course be supplied and controlled from the carrying vehicle or tractor itself in an appropriate manner.

Another significant feature or advantage regarding the use of the double-acting hydraulic unit 80 is that, through an extension of the unit 80, the shearing unit 32 can be forced downwardly about the base of the tree so as to actually effect a shearing of the tree at ground level with the shearing unit 32 being maintained horizontal through a coordinated adjustment of the shearing unit 32 and lifting frame 14. This is particularly significant and highly desirable in providing for a stump-free field. By the same token, utilizing the positive action of the hydraulic unit 80, a tendency for the underbrush surrounding the base of the tree to hold the shearing unit in an elevated position relative to the ground will be effectively overcome through the positive downward thrust on the shearing unit 32 as well as the positive locking of the shearing unit 32 at the desired shearing height, whether this be directly at ground level or in an elevated position relative thereto. With regard to this shearing at any height, it will also be appreciated that through the coordinated adjustment of the lifting frame 14 and the shearing unit 32, the shearing can be effected at exactly the horizontal or at any angle thereto.

From the foregoing, it will be appreciated that a highly unique tree shearing machine has been defined. This machine, of a relatively simple although highly unique construction, is mountable on the front end of a tractor or the like so as to allow the operator to easily view the shearing operation. The actual mounting of the unit on the tractor is effected in a manner whereby the unit can be selectively extended forwardly from the tractor for use in the shearing operation, and subsequently folded vertically against the forward end of the tractor, thereby substantially reducing the length of the combination tractor and shearing machine and at the same time enabling a utilization of the tractor for other operations without requiring that the shearing machine be removed. The completely foldable nature of the shearing attachment also allows a complete freedom of maneuverability for the tractor in moving from one work area to another or in operating in close or rough terrain. By the same token, the instant invention, in conjunction with the folding feature, also provides means for positively positioning the shearing unit at a predetermined height, this being particularly significant when it becomes desirable to shear a tree directly at the ground line, notwithstanding heavy underbrush or the like which would tend to, in the absence of means for positively positioning the shear unit, maintain the shear unit elevated above the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree shearing attachment for tractors or similar vehicles comprising a shearing unit and a vehicle engaging lift unit rearward thereof, means pivotally engaging said shearing unit with said lift unit for pivotal movement of said shearing unit relative to said lift unit about a horizontal axis between generally horizontal and vertical positions, power means engaged between the shearing unit and lift unit for effecting the pivotal movement and locking said shearing unit against movement in any adjusted position, said shearing unit comprising plate means, said plate means mounting along one side edge thereof, a jaw construction projecting forwardly relative to said lift unit, said jaw construction presenting a laterally inwardly directed tree engaging edge, a cutting blade pivotally secured at one end to said plate means for swinging movement toward and away from said jaw construction, power means engaged between said blade and said plate means for effecting a movement of said blade toward and away from said jaw construction for the shearing of a tree orientated therebetween, means for pivotally engaging said lift unit to a vehicle for pivotal movement of said lift unit about a horizontal axis rearward of and parallel to the first-mentioned horizontal axis, and power means engaged with said lift unit and engageable with a vehicle for pivotal adjustment of the lift unit about the second mentioned horizontal axis, said last mentioned power means and said power means engaged between the shearing unit and the lift unit being cooperatively actuatable for enabling a vertical adjustment of the shearing unit while maintaining a generally horizontal orientation thereof.

2. The construction of claim 1 wherein said lifting unit comprises two generally parallel lift arms adapted to parallel opposed sides of a vehicle, and a transverse mounting beam fixed to one end of said arms and adapted to extend across the front of a vehicle, said shearing unit being pivotally engaged with said mounting beam with the first-mentioned horizontal axis paralleling said beam.

3. A tree shearing attachment for tractors or similar vehicles including a fixed jaw, a cutting blade, means pivotally mounting one end of said cutting blade on a common support with said jaw for pivotal movement between a first position received adjacent said jaw and a second position outwardly thereof at an angle thereto, fluid cylinder and piston means engaged between said blade and the common support for effecting a pivotal movement of the blade, generally parallel lift arms having one end thereof adapted to be pivotally attached to a vehicle for pivotal adjustment of said arms and said common support about a horizontal axis, pivot means pivotally interconnecting said lift arms and the common support for pivotal adjustment of the common support relative to said arms about a horizontal axis parallel to the first horizontal axis and perpendicular to said lift arms, and fluid cylinder and piston means engaged between said lift arms and common support for effecting a power-controlled raising and lowering pivotal movement of the common support relative to the lift arms and a locking of the common support in any pivotally adjusted position about the second horizontal axis.

4. The construction of claim 3 wherein said common support comprises generally parallel laterally spaced upper and lower plates, each plate including a rear edge positioned transversely across said lift arms, and generally parallel side edges projecting forwardly from the rear edges, each plate including, adjacent a common side edge, a forwardly projecting portion, said jaw being defined by said forwardly projecting portions and being inwardly directed toward the second plate side edges.

5. The construction of claim 4 wherein each of said plates includes a forward edge extending rearwardly and inwardly toward the second side from the projecting portion and terminating forward of the rear edge and inward of the second side, said blade being pivoted between said plates and extending outwardly beyond the forward edges thereof at generally a right angle thereto in the second position of said blade, the fluid cylinder and piston means associated with said blade being engaged between the outer end of said blade and the second side edge portion of said plates.

6. The construction of claim 5 including a guide beam fixed to the upper plate and projecting forwardly over the front edge thereof into parallel overlying relation to said blade in the second position.

7. The construction of claim 6 wherein the outer end of said jaw curves inwardly and includes upper and lower rearwardly directed tree gripping teeth means on the inner edge thereof.

8. A tree shearing attachment comprising a shearing unit and a lift frame, said lift frame including a mounting beam orientatable transversely across the front of a self-propelled vehicle, a pair of lift arms fixed to said beam and projecting perpendicularly rearwardly therefrom to lie adjacent opposed sides of a vehicle for pivotal engagement, at the rear ends thereof, to the vehicle, cylinder and piston means engaged with said lift arms and projecting rearwardly therefrom for engagement with a vehicle for effecting a vertical pivoting of the lift frame about the pivotally secured rear ends thereof, said shearing unit comprising upper and lower generally parallel spaced coextensive plates, said plates having rear edges generally paralleling said mounting beam, means pivotally securing said plates to said beam for a pivotal swinging of said plates between a generally horizontal position and a generally vertical position about a horizontal axis paralleling said beam, cylinder and piston means engaged between the upper one of said plates and said lift frame for effecting a powered up and down pivotal adjustment of said shearing unit and a locking of said shearing unit in an adjusted position, said plates including a forwardly projecting jaw portion along one side edge thereof defining an inwardly directed fixed jaw, an elongated cutting blade, means mounting one end of said cutting blade between said plates for a pivotal movement toward and away from said fixed jaw, the forward edge of each of said plates, rearward of said fixed jaw, angling inwardly and rearwardly from said fixed jaw, said blade projecting outwardly beyond said forward edges, and power means engaged between the second side portion of said plates and the blade for effecting the movement of the blade toward and away from said jaw.

9. An improved tree shearing device including: a cutting blade, one end of said cutting blade being pivotally mounted with respect to fixed jaw means, fluid operated cylinder and piston means interconnecting said fixed jaw means and said cutting blade, two generally parallel supporting arms having their rear ends adapted to be pivotably attached to a vehicle for pivotal adjustment about a generally horizontal axis, pivot means for pivotally interconnecting said two generally parallel supporting arms and said fixed jaw means, so that said fixed jaw means can have limited pivotal movement about a horizontal axis, and double-acting cylinder and piston means interconnected between said two generally parallel supporting arms and said fixed jaw means which serves to effect a positive pivotal adjustment of said fixed jaw means about a horizontal axis generally parallel to the first axis and relative to said support arms.

10. An improved tree shearing device including: a cutting blade, one end of said cutting blade being pivotably mounted with respect to fixed jaw means, fluid operated cylinder and piston means interconnecting said jaw means and said cutting blade, an elongated horizontally disposed beam, said fixed jaw means being mounted on said beam for vertical pivotal movement about a horizontal axis paralleling said horizontally disposed beam, and said fixed jaw means being additionally connected to said elongated horizontally disposed beam by double-acting cylinder and piston means so that said fixed jaw means can be power-adjusted up and down through a pivotal arc, two generally parallel supporting arms having their front ends attached to said beam and having their rear ends adapted to be pivotably attached to a vehicle for pivotal movement of the beam about a horizontal axis parallel thereto, and means for raising and lowering said beam.

References Cited

UNITED STATES PATENTS

| | | | |
|---|---|---|---|
| 2,214,334 | 9/1940 | Knight | 144—34 |
| 2,565,252 | 8/1951 | McFaull | 144—34 |
| 2,697,459 | 12/1954 | McFaull | 144—34 |
| 2,876,816 | 3/1959 | Busch et al. | 144—3 XR |
| 3,327,745 | 6/1967 | Meece et al. | 144—34 |

WILLIAM W. DYER, JR., *Primary Examiner.*

W. D. BRAY, *Assistant Examiner.*